July 7, 1959　　　C. G. MILBOURNE　　　2,893,853
METHOD FOR CATALYTIC CONVERSION HYDROCARBONS
Filed July 12, 1956
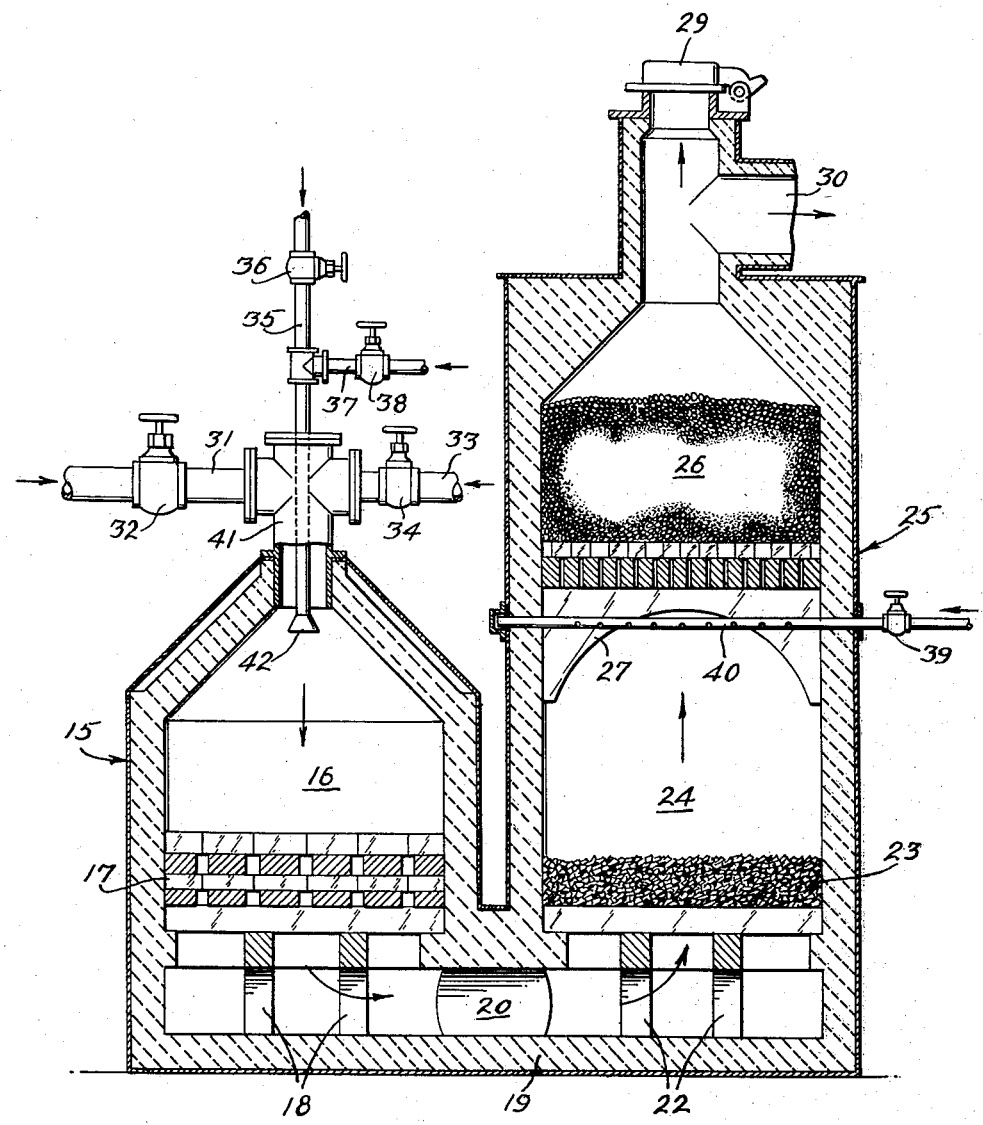
INVENTOR:
CHARLES G. MILBOURNE
BY
Howson & Howson
ATTYS.

United States Patent Office 2,893,853
Patented July 7, 1959

2,893,853

METHOD FOR CATALYTIC CONVERSION HYDROCARBONS

Charles Gordon Milbourne, Lansdowne, Pa., assignor, by mesne assignments, to The United Gas Improvement Company, Philadelphia, Pa., a corporation of Pennsylvania Application July 12, 1956, Serial No. 597,470

12 Claims. (Cl. 48—211)

The present invention relates to a novel method for producing combustible gas, and more particularly it relates to a cyclic catalytic method for the production of combustible gas having the characteristics of natural gas, and which can thus be used as a substitute for natural gas or can be blended with natural gas to take care of peak demands from a natural gas system, and this without the necessity of re-adjusting burner appliances which have been set for satisfactory burning of natural gas.

A combustible gas of a type suitable for supplementing the supply of natural gas should have a B.t.u. per cubic foot in excess of about 700–950, a specific gravity (air-1) between about .6 and .8, preferably below about 0.70. Such a combustible gas is generally known and is herein referred to as a high B.t.u. low gravity gas. All numerical B.t.u. references hereinafter are to B.t.u. per cubic foot of gas.

Natural gas has been and is being introduced in certain localities remote from natural gas fields as a relatively low cost fuel for domestic and industrial consumption, replacing manufactured gas, particularly carburetted water gas. To supply such localities with natural gas, pipe lines necessarily extending vast distances are employed. The length of these pipe lines and other factors involved in the construction and maintenance thereof, preclude the construction of parallel lines as standbys to avert cessation of delivery because of pipe line failure or to augment the normal capacity of the line to meet peak demands. Accordingly, many gas utilities are confronted with the problem of providing standby equipment for manufacturing a natural gas substitute, having substantially the same combustion characteristics as natural gas, so that it can be burned efficiently in burner appliances set for the satisfactory burning of natural gas. Many of these utilities have carburetted water gas equipment, which, however, can no longer be used to produce carburetted water gas, because such gas cannot burn satisfactorily with the same burner adjustments required by natural gas.

Oil gas, i.e., gas made by cracking oil, has been suggested as a natural gas substitute. One method of making oil gas involves, in general, a cyclic operation in which, during one part of the cycle, fuel is burned, and the hot products of combustion are passed through a bed or beds of a heat-storage material which may contain a catalyst material such as nickel, storing heat therein; and, in another part of the cycle, vaporized oil is passed, with or without steam, through the hot heat-storage material where it is cracked into a stable combustible gas. Since, as was stated above, many gas utilities have carburetted water gas equipment available, oil-gas making apparatus, wherein such a process may be conducted, has been provided by modification of such existing carburetted water gas apparatus.

The disadvantages of this process are several fold. When low grade hydrocarbon oils, such as heavy residuums or bunker C oil having a Conradson carbon content in excess of about 4% and containing as high as 3%, by weight, of sulphur, and about 0.05%, of ash, hereinafter referred to as heavy oils, are to be converted to oil gas by such a cyclic catalytic process, the sulphur, carbon and ash, each tend to impair and destroy the activity of the catalyst. For example, during the gas-making portion of the cycle, the sulphur in such a heavy oil combines with the metal catalyst, thereby significantly decreasing the catalytic activity of the metal catalyst. Thus, during the heating portion of the cycle, it is necessary to reactivate the catalyst by removing sulphur therefrom, which operation requires heating the catalyst bed to relatively high temperatures, for example temperatures above about 1600° F. However, in obtaining such high catalyst bed temperatures during the heating portion of the cycle, particularly where a modified carburetted water gas apparatus is utilized and the catalyst bed is in the last or superheater chamber thereof, heating of the oil vaporizing portion of the gas-making set, i.e., the generator and carburetter chambers, or the latter chamber alone, upstream of the superheater chamber, to relatively high temperatures also occurs, with the result that when a heavy oil is introduced into the generator and/or carburetter during the gas-making portion of the cycle, considerable thermal cracking of the oil takes place. Such thermocracking results in an oil gas which is not sufficiently close in properties to those of natural gas, as for example in terms of B.t.u. content, specific gravity and the like, so that without blending with other gases, it cannot be utilized to replace or be blended with natural gas to permit satisfactory burning in appliances set for burning of natural gas. This heating of the gas-making set to the aforementioned high temperatures during the heating part of the cycle may also cause volatilization of non-carbonaceous ash which may have been introduced by either the heating fuel or process oil or both and collected on refractory surfaces, such as ash removal screens, upstream of the catalyst bed with the result that the surface of the catalyst bodies become covered with an ash glaze which destroys the catalyst.

In an effort to control temperatures in the gas-making set in order to avert undue thermal cracking of heavy oil as it is vaporized during the gas-making portion of the cycle, and to prevent catalyst destruction by formation of an ash glaze thereon, heating of the catalyst bed to those high temperatures required for sulphur removal is avoided, thereby sulphur is permitted to accumulate in the catalyst bed resulting in the continuing reduction in catalyst activity and consequent reduction of the capacity of the gas-making equipment. When the process is conducted in this manner, it reaches a point where it can no longer be economically carried out, and the process is discontinued for a time, generally a period of several hours, during which time the catalyst is regenerated by removal of sulphur by raising the temperature of the catalyst bed to at least about 1700° F., and purging the gas-making apparatus with air or steam and air. Obviously, shutting down the process for such a period of hours, particularly at a time when the demand may be great for an oil gas suitable for replacing or blending with natural gas is extremely undesirable. Another disadvantage of this process is that carbonaceous deposits tend to build up in the vaporizer portion of the gas-making apparatus, particularly in any refractory bed or beds upstream of the catalyst bed. Such a build up of carbonaceous materials may likewise require complete shut down of the process in order to remove such deposits from the gas-making apparatus. The high temperatures employed during the several hour sulphur removal period may cause volatilization of non-carbonaceous ash on refractory surfaces resulting in formation of an ash glaze on the catalyst particles and destruction of their catalytic value.

It is the principal object of the present invention to provide a novel cyclic catalytic method for manufacturing oil gas whereby the above-mentioned disadvantages and limitations of the prior mentioned process are overcome.

Another object of this invention is to provide a novel cyclic catalytic process for producing oil gas, which oil gas can be readily substituted for or blended with natural gas, without the necessity of re-adjusting burner appliances which have been set for the satisfactory burning of natural gas.

Still another object of the invention is to provide a cyclic catalytic process for producing oil gas, in which the catalytic activity of the catalyst bed is maintained at a high state for greatly extended periods of time to greatly increase the overall capacity of oil gas-making systems.

Yet another object of this invention is to provide a cyclic catalytic process for the production of an oil gas, which can be readily substituted for or blended with natural gas, in which destruction of the catalytic value of the catalyst by formation of an ash glaze on the surface thereof is substantially prevented.

Still another object is to provide a novel cyclic catalytic oil gas-manufacturing process providing increased efficiency and economy by requiring a smaller volume of catalyst and correspondingly less heat to effect catalyst reactivation and heating of the bed to reaction temperature.

A further object of this invention is the provision of a novel cyclic catalytic process for producing oil gas from a low grade hydrocarbon oil having a substantial sulphur content wherein the burden on equipment for removing sulphur from the product oil gas is substantially reduced.

A further object of this invention is the provision of a novel cyclic catalytic method for producing oil gas wherein the volume of combustible gas, which may be substituted for natural gas, produced per hour is substantially increased, the thermal make per hour is increased, process oil consumption is decreased, and process oil efficiency is substantially increased.

A still further object of this invention is to provide a novel cyclic catalytic process for producing oil gas, which involves slight but significant modification of existing carburetted water gas apparatus, whereby the above-discussed limitations of prior converted carburetted water gas apparatus are overcome.

Other objects will become apparent from a consideration of the following specification and the claims.

The process of the present invention is, as stated, cyclic in that it involves a heating step, or a "blow," comprising the combustion of a fluid fuel and the passage of the resulting hot combustion gases through a stationary catalyst zone to store heat therein, and a gas-making step, or "run," comprising the passage of the reactants through the heated catalyst zone, wherein the reaction takes place until the temperature of the catalyst zone falls to a point where the reaction is discontinued. However, in accordance with the present method, during the heating portion of the cycle, a primary fluid fuel and an oxygen-containing gas are introduced into a refractory lined gas-making apparatus having a zone of catalyst material therein, the primary fuel is combusted, and the hot products of combustion are passed through the zone of catalyst material to store heat therein. Introduction of the primary fuel is discontinued or substantially reduced, but introduction of the oxygen-containing gas is continued and a secondary fuel, which is preferably ash free, is introduced into the apparatus. The secondary fuel is combusted in the oxygen-containing gas and the hot products of combustion are also passed through the catalyst zone to store heat therein. The point of introduction of the secondary fuel into the gas-making apparatus is at a point substantially adjacent to the catalyst zone, whereas the point of introduction of the primary fuel is at a point removed a substantial distance from the catalyst zone and upstream of the point of introduction of the secondary fuel. During the run portion of the cycle, a hydrocarbon oil is vaporized in the refractory lined path and the vaporized oil, generally with steam, is passed through the refractory lined path to heat the oil vapor to about reaction temperature with substantially no thermal cracking, and through the zone of catalyst material, wherein conversion of the vaporized oil to oil gas takes place. The resulting oil gas is then led to storage. The advantages to be gained by the process are many fold as will become more apparent from the below discussion, and include among others, catalyst regeneration with the regular cycle of operation, and substantial elimination of thermal cracking as compared to cyclic cracking, and substantial elimination of catalyst destruction by ash contamination.

The process, therefore, comprises, during the heating portion of the cycle, introducing a fluid primary fuel and an oxygen-containing gas into a refractory lined path having a zone of catalyst material therein, combusting the primary fuel and passing the hot product of combustion through the refractory lined path and through the zone of catalyst material to store heat therein, at least substantially reducing the rate of introduction of primary fuel while continuing introduction of the oxygen-containing gas, introducing a fluid secondary fuel into the refractory lined path, combusting the secondary fuel in the oxygen-containing gas and passing the hot product of combustion through the zone of catalyst material to store heat therein, the point of introduction of the secondary fuel being substantially adjacent the zone of catalyst material and the point of introduction of the primary fuel being upstream from the point of introduction of said secondary fuel, and in the gas-making portion of the cycle, vaporizing an oil in the refractory lined path and passing the vaporized oil through the refractory lined path to heat said oil to about reaction temperature with substantially no thermal cracking, and through the zone of catalyst material, wherein conversion of vaporized oil to oil gas takes place, and leading the resulting oil gas to storage.

In accordance with a preferred embodiment of the process, a zone of non-catalytic, refractory, heat-storage material, as for example refractory bodies such as fire brick arranged in the familiar checkerwork pattern, is employed between the zone of catalyst material and the point of introduction of the primary fuel, and a zone of discrete non-catalytic, refractory particles comprising an ash removal screen is employed between the zone of catalyst material and the zone of heat-storage refractory material. The point of introduction of the secondary fuel is located substantially adjacent to the zone of catalyst material at a point between the zone of catalyst material and the ash removal screen, so that the hot combustion products produced during the primary heating stage of the heating portion of the cycle, i.e., from the combustion of primary fuel above, pass through the zone of non-catalytic, refractory, heat-storage material, the ash removal screen, and then through the zone of catalyst material, and the hot combustion products produced during the secondary stage of the heating portion of the cycle, i.e., products of combustion of the secondary fuel pass through the zone of catalyst material to store heat therein. The primary fuel may have an ash content for the products of combustion of primary fuel will pass through the ash removal screen wherein the ash is abstracted from the combustion products. Since there is no ash screen disposed between the point of introduction of secondary fuel and the catalyst bed, the secondary fuel is preferably an ash free fuel such as a gaseous or hydrocarbon distillate fuel. During the gas-making portion of the cycle vaporized process oil is preferably accompanied by steam.

This invention and the several advantages to be obtained thereby will be more fully described in connection with the accompanying drawings, which discloses a preferred embodiment of an apparatus which may be employed in carrying out the process of this invention.

With respect to the figure, 15 is a confining, refractory lined chamber, which may be the carburetter of a conventional water gas set with appropriate modifications as is obvious from the drawing. Chamber 15, hereinafter referred to as the vaporizer comprises primary combustion and oil vaporizing space 16 in its upper portion, and has in the lower portion thereof a bed 17 of refractory non-catalytic heat storage bodies such as fire brick arranged in familiar checkerwork pattern, as shown, or randomly arranged pieces of refractory material or both. The heat-storage material may be supported as by fire brick arches 18. 25 represents a second refractory lined chamber which may be the superheater of a conventional water gas set with appropriate modification as shown, and hereinafter referred to as the reformer, containing in its lower portion ash removal bed 23 of discrete non-catalytic refractory shapes. The discrete non-catalytic refractory shapes of which ash removal bed 23 is formed may comprise spheres, preferably of diverse diameters ranging from ½" to 2". In the upper portion of reformer 25 is a bed of catalyst material 26. Ash screen 23 and catalyst bed 26 may be supported as by fire brick arches 22 and 27, respectively. The bottom of vaporizer 15 is connected to the bottom of reformer 25 by passageway 20 having a refractory lining 19 wherein process oil which has not been vaporized in vaporizer 15 is substantially completely vaporized during passage therethrough. Passage-way 20 and the bottom portions of vaporizer 15 and reformer 25 also comprises an area wherein a large portion of the inert ash in primary fuel combustion products and vaporized process oil may fall out of the vapor steam prior to passage through the final ash removal screen 23. The substantially complete vaporization of the oil prior to passage through ash screen 23 avoids the spalling of the refractory shapes forming the screen by impingement of liquid oil particles thereon.

29 represents a stack valve through which the products of combustion may pass to the atmosphere, and 30 represents a conduit through which the combustible product gas may pass to a wash box and gas-recovery equipment. Chamber 15 and 25 and passage or "gas-way" 20 comprises the refractory lined path referred to herein.

Vaporizer 15 is provided at its upper end with inlet nozzle 42 through which fluid primary fuel, such as tar, low-grade hydrocarbon oil, including bunker C oil, gas, etc., is supplied during the heating portion of the cycle by means of inlet pipe 35 provided with control valve 36. Process oil is also introduced to vaporizer 15 by means of inlet nozzle 42 during the gas-making portion of the cycle, the process oil being supplied by means of inlet pipe 37, provided with valve 38. Both primary fluid fuel and process oil pass through manifold 41 by means of pipe 35. The primary supply of oxygen-containing gas, such as air, is introduced into vaporizer 15 through manifold 41, the oxygen-containing gas being supplied to manifold 41 by means of inlet pipe 31 having control valve 32. Purge steam and process steam are supplied to manifold 41 by inlet pipe 33, the flow of steam therethrough being controlled by valve 34, and introduced to vaporizer 15 through the manifold.

Disposed in reformer 25, in space 24 lying between ash removal screen 23 and catalyst bed 26, is secondary fluid fuel introducing means 40, which may take the form of a perforated pipe. The rate of introduction of secondary fuel may be controlled by means of valve 39. Preferably the secondary fluid fuel is ash free since there is no ash removal means, such as ash screen 23, disposed between secondary fuel introducing means 40 and catalyst bed 26 to prevent ash contamination of the catalyst.

If desired, conventional three shell carburetted water gas equipment may be employed in its entirety, with, for instance, the generator acting in the same capacity as the carburetter in the two shell set illustrated in the figure. In the three shell set, the generator may be connected by its base to either the carburetter or the superheater, or conventional generator-carburetter reformer arrangements may be retained, with the generator serving as an elongation of the vaporizing zone.

Furthermore, apparatus for carrying out the process of this invention may comprise a single shell, with the vaporizing zone, including means for the admission of primary fluid fuel, steam, process oil, and air situated at the lower end of the shell, followed in ascending order in a substantially vertically disposed refractory lined path by a heat-storage zone, ash removal means, secondary fuel introducing means and a catalyst zone, and with gas exits similar to those of reformer 25, the figure positioned in the upper portion thereof. This single shell arrangement may be inverted if desired, with the gas path descending through the shell from the vaporizer in the upper portion to gas exits in the lower portion, with the stack valve co-acting with a vertical duct or chimney which exceeds the single shell in height.

The respective points of introduction of the gas-making apparatus of primary fuel, secondary fuel, process oil, steam and oxygen-containing gas, according to this invention, are of primary importance. As stated above, introduction of secondary fuel should take place at a point substantially adjacent to the zone of catalyst material. By substantially adjacent is meant from one to several feet from the catalyst bed, depending for example upon the size, type and capacity of the particular apparatus used. Fuel introducing means 40, by which fluid secondary fuel is admitted during the secondary phase of the heating portion of the cycle, preferably should be spaced far enough upstream of catalyst zone 26 and its fire brick supporting arches 27 to permit entering fluid secondary fuel to substantially completely mix with the oxygen-containing gas stream passing inlet means 40 and to ignite and be at least partially combusted prior to entering catalyst zone 26. However, the segment of the refractory lined path traversed by the hot products of combustion of secondary fuel prior to entering catalyst zone 26 should be relatively short, so the mixture of steam and process oil vapors traversing this segment of the refractory lined path during the gas-making portion of the cycle will be exposed to high temperatures which may cause thermal cracking of the oil for a minimum possible time. This is essential since the objectives of this invention are realized in proportion to the degree in which steam hydrocarbon catalytic reforming occurs, resulting in the formation of $CO$, $CO_2$ and $H_2$, together with any hydrocarbon scission, resulting in the formation of lower molecular weight hydrocarbons from higher molecular weight hydrocarbons, which may be simultaneously catalytically effected, as compared to thermal cracking in which apparatus clogging carbon is a primary reaction product.

If one or more zones of refractory heat-storage material, as for example a zone of fire brick having a checkerwork pattern or a bed of discrete refractory shapes reforming an ash removal bed, are provided upstream of the catalyst zone in the refractory lined path, the secondary fuel must be introduced at a point adjacent the catalyst zone downstream with respect to such zones, for by so introducing secondary fuel, no zone of refractory heat-storage material will acquire heat from the combustion of secondary fuel, which heat will be cyclically transmitted to and contribute to thermal cracking of process oil vapors passing through the zones of refractory material during the gas-making portion of the cycle. Also, hot products of combustion of secondary fuel would volatilize any non-carbonaceous ash on refractory surfaces, as for example the ash screen, resulting in destruction of the catalyst by formation of an ash glaze thereon.

Introduction of primary fuel should take place at a point removed a substantial distance from the catalyst zone, whereby a sufficient portion of the gas-making apparatus may be heated to the degree necessary to provide the heat required to insure substantially complete vaporization of relatively large volumes of process oil and the heating of the vaporized oil to about catalytic reforming temperatures prior to passage of the vaporized oil stream through the bed of catalyst material. Here again, the exact location of the point of introduction of primary fuel will depend upon the capacity and size of the process apparatus and like factors. Where the gas-making apparatus includes one or more zones of refractory, heat-storage material upstream of the zone of catalyst material, the point of introduction of primary fuel is preferably upstream of these heat-storage zones, so that the products of combustion of primary fuel may store heat therein and any ash in the primary fuel may be abstracted from combustion products, as for example by an ash screen prior to entering the catalyst bed.

Means for admitting an oxygen-containing gas is also provided at a point removed a substantial distance from the catalyst zone and preferably at a position near the point of introduction of primary fuel whereby a combustible mixture of fuel and oxygen-containing gas is obtained. By so locating the point of introduction for oxygen-containing gas upstream of the catalyst bed, after introduction of the primary fuel has been discontinued, or at least substantially reduced, and introduction of secondary fuel is begun, the continued flow of oxygen-containing gas acts to temper the surface of the ceramic lined path and zone of heat-storage material and as removal bed upstream of the catalyst zone. Thus, by controlled combustion of primary fuel and controlled introduction of air after the introduction of primary fuel is discontinued or at least substantially reduced, the process oil vaporizing and heating means, i.e., the hot refractory lined path and zone of heat-storage, refractory material therein, are so conditioned by the end of the heating portion of the cycle that during the gas-making portion of the cycle, the process oil is vaporized and the resulting reaction mixture of oil vapors and steam is heated, preferably to catalytic reforming temperatures, by heat stored in the refractory lined path and zones of refractory heat-storage material with substantially no thermal cracking taking place.

Besides conditioning the refractory lined path by passage of air therethrough after introduction of primary fuel is discontinued or substantially reduced to prevent thermal cracking of process oil, the air is highly heated so that very high temperatures are obtained in the catalyst bed by combustion of secondary fuel in the heated air. By means of these high temperatures, sulfur is removed from the catalyst during the heating portion of the cycle and during an air purge following the heating portion of the cycle. Such sulphur removal maintains the catalyst activity at a high level for the run portion of the cycle. The regenerated catalyst in a high state of activity not only makes possible an efficient gas-making process, but also effects substantial removal of sulphur, e.g. 50% removal, from product gas, which sulphur removal would not be possible with a sulphur deactivated catalyst. This sulphur removal by the catalyst substantially reduces the requirements of product gas sulphur removal equipment.

A further advantage of the instant process wherein high catalyst temperatures are obtained without heating of the refractory lined path to thermal cracking temperatures is that volatilization of ash from refractory surfaces upstream of the catalyst bed and resulting catalyst destruction by formation of an ash glaze on the surface of the catalyst particles is substantially prevented.

These and other reasons why the locations of the points of introduction of the primary and secondary fuels are of first importance are set forth in greater detail below in the discussion of the heating portion of the cycle.

In the normal cyclic operation of the process of this invention as conducted in the apparatus illustrated in the drawing, the cycle commences with the forcing of air and primary fluid fuel through manifold 41 and nozzle 42, respectively, into chamber 16 of vaporizer 15. The resulting combustible mixture is ignited by residual heat in the refractory lining of vaporizer 15 or by other means of ignition well known in the art, and the hot products of combustion pass down through vaporizer 15 and through refractory, heat-storage material or fire brick checkerwork bed 17 storing heat therein, and leave vaporizer 15 by means of gas way 20. The hot products of combustion then enter reformer 25, where they pass upward through ash removal screen 23 and space 24, and continue upward and pass through and store heat in catalyst bed 26. The combustion products leave reformer 25 through cyclically open stack valve 29 or equivalent exit means, ultimately to disperse in the atmosphere.

Introduction of air and of primary fuel into vaporizer 15 is continued until the cyclic heat requirement of vaporizer 15 and heat storage zone or bed 17 has been accumulated, whereupon the supply of primary fuel through inlet pipe 35 is discontinued or substantially diminished by means of valve 36. The supply of air from inlet pipe 31 through manifold 41 to vaporizer 15 is continued, preferably at an undiminished rate. The continued introduction of primary air reduces the temperature of the refractory surfaces in combustion chamber 16, heat-storage zone 17, fire brick arches 18, passage way or gas-way 20, fire brick arches 22, ash screen 23 and zone 24, and transfers heat from these portions of the apparatus, particularly the vaporizer, where a controlled temperature is desired during the gas-making portion of the cycle. The air so heated burns or "scurfs off" carbon that may have been deposited during the prior gas-making phase of the cycle. However, control of the temperature of the refractory surfaces, as for example the ash screen, prevents volatilization of ash from the surfaces and prevents destruction of catalyst activity by ash deposits. With the primary air with its oxygen content substantially intact continuing to flow in a preheated condition about fluid fuel inlet means 40, secondary fluid fuel, which is preferably ash free, is introduced thereto through operation of valve 39. Ignition of the secondary fuel in the stream of preheated air is effected by the residual heat in the refractory walls of space 24 and catalyst bed supporting arches 27. The preheated condition of the air supply assists in obtaining a high secondary combustion flame temperature. The hot products of combustion of secondary fuel flow through catalyst zone 26 and effect substantially complete removal of sulphur from the surface of the catalyst material and store sufficient heat in the catalyst zone to provide the heat and high temperatures required in the gas-making portion of the cycle. The products of the combustion of secondary fuel leaves reformer 25 through cyclically opened stack valve 29 or equivalent exit means, ultimately to disperse in the atmosphere in the same manner as the products of combustion of the primary fuel. Although not shown in the drawing, before ultimately venting all combustion products in the atmosphere, they may be led from the reformer through means which are equivalent to stack valve 29 and which are led through a waste heat boiler in accordance with conventional gas practice.

As illustrated in the figure, and as stated in the foregoing discussion, the point of introduction of primary fuel is substantially removed from the zone of catalyst material whereas the point of introduction of secondary fuel is substantially adjacent the zone of catalyst material, both points of fuel introduction being upstream from the catalyst bed in the refractory-lined path or gas path. Thus, the points of introduction of heating air and of primary fuel are so located with respect to the catalyst zone that during the heating portion of the cycle a sufficient portion of the gas-making apparatus is heated to the controlled elevated temperature necessary to provide the heat required during the gas-making portion of the cycle to insure substantially complete vaporization of the cyclically required quantity of process oil without deleterious thermal cracking of the oil or vaporization of the deposited ash. Thus, referring to the figure, during the combustion of primary fuel, comprising the first phase of the heating portion of the cycle, heat is stored in vaporizer 15 and reformer 25. Also, during this first heating phase, the gas-making apparatus may be heated to relatively high temperatures in order to effect at least partial regeneration of the catalyst by removal of some of the carbon and sulphur thereon, but not to temperatures sufficiently high to cause volatilization of ash deposited upstream of the catalyst bed.

As stated hereinbefore, the point of introduction of secondary fuel should be sufficiently close to the catalyst zone so that reactant mixtures of process vapors and steam passing through the gas-making equipment during the gas-making portion of the cycle prior to passing into the catalyst zone, pass through a relatively short segment of highly heated gas-making equipment, and experience a minimum of opportunity for the occurrence of thermal cracking. With the secondary fuel inlet spaced from the catalyst only sufficiently to allow mixture of the secondary fluid fuel with the passing stream of oxygen-containing gas, substantially no thermal cracking takes place. By use of a preferred ash free secondary fuel activity of the catalyst is not destroyed by ash deposited by its combustion. Also, since the hot products of combustion do not come in contact with areas of the apparatus wherein ash may be deposited, i.e. the ash removal screen and portions of the apparatus upstream of the ash screen, deposited ash is not volatilized so that it may form a glaze on the catalyst particles destroying their catalytic activity.

The manner in which primary and secondary fuel may be combusted can be varied to suit the needs of a specific process embodying the concept of the invention. In the preferred practice of the process of this invention, the primary fuel is shut off completely with air continuing to flow at an undiminished rate from manifold 41. After the elapse of from 1 to 5 seconds to allow the products of primary combustion to be purged from the gas path extending at least to the catalyst zone, the secondary fluid fuel is admitted through inlet means 40 adjacent the catalyst zone.

It may be desired to continue a reduced primary combustion throughout the heating portion of the cycle or at least throughout a part of the time during which secondary fuel is combusted. For instance, it may be desired to burn primary fuel in combustion chamber 16 with from 200% to 300% excess oxygen in order to provide a supply of oxygen heated to an elevated temperature at the inlet to the refractory vaporizing zone in order to implement the combustion of difficultly removable carbon deposited therein. However, it is imperative that the oxygen-containing gas for supporting combustion of the secondary fuel, on passing the secondary fuel inlet pipe 40, contain a concentration of oxygen sufficient to initiate and support the combustion of secondary fuel. The initiation and the support of combustion by this air is of course assisted by its preheated condition, and by the presence of heated refractory catalyst supporting surfaces 27 adjacent to secondary heating fuel inlet 40. Generally, if introduction of primary fuel is continued after introduction of secondary fuel is begun, the rate of introduction of primary fuel is reduced to less than about 25% of the rate of introduction prior to secondary fuel introduction.

As stated earlier, an object of this invention is to provide a cyclic catalytic process for producing oil gas in which the catalytic activity of the catalyst bed is maintained at a high state for extended periods of time. Sulphur, either in a form in which it is contained in the fuel used or in some other form, is a primary cause of catalyst deactivation. A second cause is the presence of ash, i.e., non-carbonaceous material, minor but significant quantities of which may accompany fluid fuels and process hydrocarbons. A third factor contributing to the impairment of catalyst activity comprises carbon, which results from the impingement on the highly heated refractory surfaces, of either the more difficult volatilizable hydrocarbons poor in hydrogen present in heavy process oils, or of lighter hydrocarbons which when overheated decompose thermally yielding carbon and hydrogen. The formation of some carbon during the gas-making part of the cycle is to some extent unavoidable, but it may be controlled substantially completely, or at least to a considerable extent, by providing oxygen in an amount in excess of that required for combustion of heating fuel, or by a separate air introduction step during the heating part of the cycle. Steam may also be supplied with the air if desired.

Deposition of carbon may occur in the heat-storage zone, in the ash removal screen and in the catalyst bed. Some carbon which may be formed in the process oil vaporizing and vapor preheating zones during the gas-making portion of the cycle may be trapped in the ash screen. These carbon deposits are burned during the combustion of secondary fuel during the succeeding heating portion of the cycle, by the hot oxygen-containing gas, which is entirely or substantially devoid of products of combustion, as it flows through the preheat zone, ash removal screen and catalyst zone. In this manner the gas path is maintained substantially free of carbon.

Primary fluid fuel may have an ash content as may process oil, particularly heavier grades. The ash from these oils may deposit as a slag on any refractory surface which it encounters, and subsequently harden to a glaze. The ash removal screen described is intended to contact the gases passing therethrough with an intimacy sufficient to obtain substantially complete removal of ash from the gas stream. Generally, the refractory lined path should have a configuration such as to provide the ash with an opportunity to drop out of the gas stream prior to contact with the ash screen. Contact of ash with the catalyst should be avoided, as glazing of the catalyst body surfaces may permanently inactivate the catalyst. The ash removal screen should lie downstream of the heat storage zones in the gas stream, since it is desirable that the ash screen be contacted only by vapors and not by liquid globules which would cause spalling and disintegration of the ash screen shapes with increased back pressure and resistance to fluid flow.

Since the point of introduction of secondary fuel is downstream of the ash screen and upstream of the catalyst bed, this fuel is preferably ash free, for with no ash screen to protect the catalyst bed, any ash introduced by the secondary fuel would contact and deactivate the catalyst material. Suitable ash free fuels include gaseous and light hydrocarbon distillate fuels.

The process of this invention generally obviates the necessity of operational shut downs for periods of several hours for removing sulphur from the catalyst, for catalyst regeneration takes place during each heating portion of the cycle. Catalyst regeneration is effected cyclically by heating of the catalyst to the high temperatures required for sulphur removal by combustion of secondary fuel in preheated air and by an air purge of the highly heated catalyst following the heating portion of the cycle. As previously stated, the manner in which the heating part of the cycle is conducted makes such cyclic catalyst regeneration possible without thermal cracking of process oil during the run, since temperatures of the vaporizer portion of the gas-making equipment upstream of the point of introduction of secondary fuel, which point is adjacent the catalyst bed, are controlled by continued introduction of an oxygen-containing gas which passes through the vaporizer portion of the apparatus prior to acting as a combustion-supporting gas for combustion of secondary fuel. Since sulphur is removed from the catalyst prior to each run portion of the cycle, the catalyst is in a condition to accept additional amounts of sulphur in product gas produced by reforming a low grade sulphur-containing process oil. The catalyst may abstract as much as 50% or more of the sulphur in the product gas during each run; thus, the load on sulphur removal equipment advantageously is in like measure accordingly reduced. Such sulphur removal is not possible with a sulphur deactivated catalyst which is no longer in a condition to accept substantial quantities of additional sulphur.

As pointed out previously, the manner in which the heating portion of the cycle is conducted advantageously makes possible control of temperatures in that portion of the gas-apparatus which is upstream of the catalyst bed. It is in this portion of the apparatus, including the ash removal screen and that part of the gas-making set upstream thereof, that ash is for the most part deposited. Thus, although high catalyst bed temperatures are obtained to regenerate the catalyst, temperatures in that portion of the gas-making set wherein ash is deposited are not permitted to become sufficiently high to cause volitalization of the ash thereby making it possible for the ash to form a glaze on the catalyst and destroy its catalytic activity. This ash glaze is generally not removable by known catalyst regeneration methods. The use of an ash free secondary fuel to prevent similar catalyst deactivation has been mentioned previously.

After the catalyst has been regenerated and sufficient heat has been stored in the catalyst to provide proper reaction temperatures, the primary, if any, and secondary fuel supplies are discontinued and "open" and "closed" air and/or steam purges may be applied as hereinafter described. Stack valve 29 is closed and with process steam flowing through steam inlet pipe 33 and manifold 41 into refractory lined space 16, process oil is forced through inlet pipe 37 and pipe 35 and is admitted as a spray into space 16 by means of nozzle 42. The mixture of steam and oil flows from space 16 through refractory heat-storage zone 17 through refractory lined passage-way 20, and through refractory ash removal screen 23. The enumerated refractory surfaces, including their refractory supporting arches, vaporize the oil preferably prior to its passage through ash removal screen 23, and heat the oil vapor-steam mixture to about catalytic reforming temperatures. The major portion of any non-vaporizable, non-carbonaceous material, comprising the ash content of the oil, drops out of the oil vapors in space 20, with the remaining ash being substantially abstracted and retained by the refractory shapes of screen 23. The steam and oil vapors, in passing through the prescribed refractory path, however, are not exposed to temperatures which would cause any significant amount of thermal cracking of the process oil or vaporization of ash.

The hot steam and oil vapor, under a presure of from about 1 to 5 p.s.i.g., derived from the reactant introduction pressures, are forced through the interstices of the catalyst bed which may comprise catalytically active refractory shapes, such as spheres of from about ⅜ inch to 3 inches in diameter having a surface comprising nickel or cobalt. The bed of catalyst material may be between about 6 inches and 60 inches in depth, and must contain sufficient heat at the start of the gas-making portion of the cycle to effect the required endothermic reforming reactions to provide a product gas mixture comprising saturated and unsaturated hydrocarbons, hydrogen, oxides of carbon and inert gases. The product gas is led from the catalyst bed through conduit 30 to gas recovery equipment known in the art, not shown in the drawing. When the heat stored in vaporizer 15 and reformer 25 during the heating portion of the cycle has ben expended to an extent below which the reforming operation may no longer be efficiently conducted, the flow of process oil is discontinued by closing valve 38. "Closed" and "open" steam and/or air purges may be applied, accompanied by the opening of stack valve 29 which signifies the end of the gas-making portion of the cycle and the start of the heating portion of the succeeding cycle.

The foregoing description of the process has dealt, for the most part, with the main steps of the cycle and it will be understood by those familiar with the gas-making art that suitable purges of the type mentioned above may be made between the principle steps, to clear the system of undesirable gases, to insure greater recovery of the desired gases and to prevent accumulation of explosive mixtures in the system. For example, between the heating step and the gas-making run, there is advantageously a brief purging period to force residual combustion products out the stack. This may be accomplished by admitting purging gas, such as steam, through manifold 41.

Referring to the fuels employed during the heating step, they may comprise any fluid fuel such as those ordinarily employed in the gas-making industry, for instance, petroleum, oil, tar, combustible gas, and the like. Preferably fuels employed will be hydrocarbons and a wide variety of such materials are available for this use, ranging from relatively light distillates, through Nos. 2 and 3 furnace oils to heavy residuum oils and the like. However, as mentioned above, the secondary fuel is preferably substantially devoid of any ash content.

The present process and apparatus permit the utilization of a wide range of gas-making oils. The gas-making oil may range from light hydrocarbons such as propane, butane, kerosene and the like, medium oils ranging through gas oils and diesel oils and crude oils to heavy residuum oils. The present invention is particularly directed to the use of residuum oils which may produce heavy coke and other carbonaceous deposits during the gas-making portion of the cycle.

The catalyst employed in accordance with the process of the present invention comprises discrete bodies of refractory material having nickel or cobalt available at least at the surface thereof. The nickel or cobalt may merely be dispersed at the surface of suitable refractory bodies, such as alumina, aluminum silicate, magnesia, or the like, or it may be distributed throughout the refractory body so long as it is also present at the surface. In the preparation of a preferred type of catalyst, preformed refractory bodies, such as alundum, are impregnated with a nickel salt and thereafter the impregnated shapes are calcined to form the oxide of the nickel which is subsequently reduced. The catalyst, as stated, will be in the form of discrete bodies, such as spheres, cubes, cylinders, pellets, pebbles, and the like. The catalyst bodies will also be relatively dense that is, they will have a porosity no greater than about 35%, and preferably of from about 10 to about 25%, according to the porosity test scale of Testing Method No. C20–46 of The American Society for Testing Materials.

The temperatures in the catalyst zone, from the inlet to the outlet thereof, over the entire operating cycle, may average as high as 1900° F., and generally will exceed 1300° F. Preferably, these cyclic and positionally average temperatures will lie between about 1600° and 1800° F. As noted, these are average temperatures, and it will be understood that at least cyclic maximum inlet temperatures to the catalyst zone may exceed the higher stated temperatures, and conversely, minimum exit temperatures may fall below the lower temperatures stated. Average temperatures in the process oil vaporizing portion of the apparatus during the gas-making portion of the cycle should be sufficient to vaporize the oil but not produce any substantial amount of thermal cracking or any vaporization of the deposited ash, and for that reason these average vaporizer temperatures during the run should lie between about 1000° F. and about 1700° F., with a preferred range of temperature being between about 1200° and 1500° F.

Although the instant process may be so operated as to provide a high B.t.u., low gravity gas, suitable as a substitute for natural gas or as a material to blend therewith, it may be adopted for the production of a low B.t.u., low gravity gas, if required. In this connection, desired quanties of products of combustion, preferably incomplete combustion, of fuel during the heating portion of the cycle may be led to the gas recovery equipment for mixture therein with product gases. The inclusion of such products of incomplete combustion with product gases is known in the gas industry as a "blow run." It may be desirable to form products of incomplete combustion and lead them to storage, following the steam-hydrocarbon reforming portion of the cycle. The primary and secondary heating steps of the heating portion of the cycle may then be executed with the products of combustion being exhausted into the atmosphere.

The process of the present invention will be more clearly understood from a consideration of the following specific example which is given for the purpose of illustration only and is not intended to limit the scope of the invention in any way.

Parallel examples of operation on a commercial set, affording a comparison of conditions used and results obtained when employing and not employing the process of the present invention are set forth in Table I below. The equipment used was similar to that shown in the drawing, comprising a refractory-lined path formed of two bottom connected refractory lined vessels, the first vessel comprising a combustion chamber with air, heating fuel, process oil and steam admission means, and a lower zone of heat storage refractory material, and the second vessel comprising a catalyst zone with secondary fuel admission and ash removal means located below the catalyst zone, and waste gas and product gas outlets. The catalyst zone comprises a bed 60 inches deep of discrete refractory particles having a nickel content on the surface thereof. The secondary fuel comprised a gaseous ash-free fuel.

Operating conditions and results shown in the first column, entitled run No. 1, were obtained by a process which was not the process of the present invention, whereas operating conditions and results shown in the second column, run No. 2, exemplify the use of the present invention.

Table I

| Event | Run No. 1 (2 min. cycle) | Run No. 2 (2 min. cycle) |
|---|---|---|
| Air purge time, min | .06 | .08 |
| Air purge rate, c.f./min | 17,200 | 18,500 |
| Primary heating time, min | 1.08 | .80 |
| Primary heating air rate, c.f./min | 17,000 | 18,000 |
| Primary heating gas rate, c.f./min | 1,050 | 1,200 |
| Air purge time, min | | .02 |
| Air purge rate, c.f./min | | 18,200 |
| Secondary heating time, min | | .18 |
| Secondary heating air rate, c.f./min | | 18,000 |
| Secondary heating gas rate, c.f./min | | 1,200 |
| Air purge time, min | .32 | .24 |
| Air purge rate, c.f./min | 17,500 | 18,200 |
| Steam purge time, min | .08 | .08 |
| Steam purge rate, lbs./min | 475 | 475 |
| Stack open, minutes | 1.54 | 1.40 |
| Cracking run time, min | .30 | .32 |
| Cracking steam rate, lbs./min | 475 | 475 |
| Cracking oil rate, gal./min | 109 | 100 |
| Steam purge, min | .12 | .24 |
| Steam purge rate, lbs./min | 475 | 475 |
| Air purge time, min | .04 | .04 |
| Air purge rate, c.f./min | 13,000 | 13,000 |
| Stack open, minutes | .46 | .60 |
| Results: | | |
| Heating value gas produced, B.t.u | 826 | 785 |
| Specific gravity gas produced | .648 | .626 |
| Corrected gas produced per set hour, cu. ft. | 92,000 | 103,000 |
| Thermal output per set hour, therms | 7,580 | 8,060 |
| Process oil used per M c.f.—gal | 10.13 | 8.34 |
| Process oil efficiency, percent | 55.2 | 63.6 |
| Analysis of Make Gas Sample: | | |
| $CO_2$ | 3.2 | 3.6 |
| Illuminants | 18.8 | 17.0 |
| $O_2$ | 0.4 | 0.4 |
| CO | 8.6 | 9.4 |
| $CH_4$ | 33.6 | 34.2 |
| $H_2$ | 28.8 | 24.8 |
| $N_2$ | 6.6 | 10.6 |
| | 100.0 | 100.0 |

A comparison of the results of runs No. 1 and No. 2 shows that by the process of this invention more active reforming is effected, yielding a product gas of lower heating value and lower specific gravity (785 B.t.u. vs. .826 B.t.u. and .626 S.G. vs. 648 S.G.) with the volumetric make of gas per hour being increased to 103,000 cu. ft. from 92,000 cu. ft., the thermal make per hour being increased to $8060 \times 10^5$ B.t.u. from $7580 \times 10^5$ B.t.u., the process oil consumption per M c.f. being decreased to 8.34 gal. from 10.13 gal., and the process oil efficiency, i.e., the ratio of heat in gas made divided by the heat in the make oil used being increased to 63.6% from 55.2%.

Considerable modification is possible in the selection of the process oil, fuel and in the arrangement of parts without departing from the scope of the invention.

I claim:

1. The cyclic catalytic method for the manufacture of oil gas involving alternating heating and gas-making portions which comprises, (A) during the heating portion of the cycle, (1) introducing a primary fluid hydrocarbon fuel and an oxygen-containing gas into a refractory lined path having a zone of catalyst material therein in the downstream portion thereof, combusting said primary fuel and passing the hot products of combustion through said refractory lined path and through said zone of catalyst material to store heat therein; and (2) thereafter reducing by more than 75% the rate of introduction of said primary fuel, while continuing introduction of said oxygen-containing gas, and (3) substantially immediately after the products of primary combustion formed just prior to reducing the rate of introduction of said primary fuel have passed at least through that portion of said refractory lined path preceding said zone of catalyst material, introducing a substantially ash free secondary fluid hydrocarbon fuel into said oxygen-containing gas, combusting said secondary fuel in said oxygen-containing gas and passing all hot products of combustion through said zone of catalyst material to store heat therein, the point of introduction of said secondary fuel being substantially adjacent said zone of catalyst material and the point of introduction of said primary fuel and said oxygen-containing gas being upstream from said point of introduction of said secondary fuel, the rate of introduction of said oxygen-containing gas and combustion of said primary fuel and said secondary fuel maintaining throughout the cycle in said catalyst zone an average temperature of from about 1300° to 1900° F. and in the refractory lined path upstream of said catalyst zone an average temperature of from about 1000° to 1700° F.; and (B) in the gas-making portion of the cycle, vaporizing a hydrocarbon oil in said refractory lined path upstream from said catalyst zone and passing said vaporized oil through said refractory lined path upstream from said catalyst zone, to heat said oil to about reaction temperature with substantially no thermal cracking, and then through said zone of catalyst material wherein conversion of said vaporized oil to oil gas takes place, and leading the resulting oil gas to storage.

2. The method of claim 1 in which the catalyst material comprises nickel, and steam is passed through said refractory lined path and through said zone of catalyst material during the gas-making portion of the cycle.

3. The method of claim 1 in which introduction of primary fuel is substantially discontinued during introduction of secondary fuel.

4. The cyclic catalytic method for the manufacture of oil gas involving alternating heating and gas-making portions which comprises, (A) during the heating portion of the cycle, (1) introducing a primary fluid hydrocarbon fuel and an oxygen-containing gas into a refractory lined path having in series a zone of non-catalytic, refractory, heat-storage material and a zone of catalyst material, combusting said primary fuel and passing the hot products of combustion through said refractory lined path, through said zone of heat-storage material and then through said zone of catalyst material to store heat therein, and (2) thereafter reducing by more than 75% the rate of introduction of said primary fuel, while continuing introduction of said oxygen-containing gas, and (3) substantially immediately after the products of primary combustion formed just prior to reducing the rate of introduction of said primary fuel have passed at least through that portion of said refractory lined path preceding said zone of catalyst material, introducing a substantially ash-free secondary fluid hydrocarbon fuel into said refractory lined path at a point adjacent said zone of catalyst material between said zone of heat-storage material and said zone of catalyst material, combusting said secondary fuel in said oxygen-containing gas and passing all hot products of combustion through said zone of catalyst material to store heat therein, the rate of introduction of said oxygen-containing gas and combustion of said primary fuel and said secondary fuel maintaining throughout the cycle in said catalyst zone an average temperature of from about 1300° to about 1900° F. and in the refractory lined path and zone of heat-storage material upstream of said catalyst zone an average temperature of from about 1000° to about 1700° F.; and (B) in the gas-making portion of the cycle, vaporizing a hydrocarbon oil in said refractory lined path and passing said vaporized oil through said refractory lined path and through said zone of heat-storage material to heat said oil to about reaction temperature with substantially no thermal cracking, and then through said zone of catalyst material, wherein conversion of said vaporized oil to oil gas takes place, and leading the resulting gas to storage.

5. The method of claim 4 in which said catalyst material comprises nickel and steam is passed through said refractory lined path, said zone of heat storage material and said zone of catalyst material during the gas-making portion of the cycle.

6. The method of claim 4 in which introduction of primary fuel is substantially discontinued during introduction of said secondary fuel.

7. The method of claim 4 in which there is an ash screen comprising a bed of randomly arranged pieces of a non-catalytic, refractory, heat-storage material in said refractory lined path between said point of introduction of said secondary fuel and said first-mentioned zone of heat-storage material.

8. The cyclic catalytic method for the manufacture of oil-gas involving alternating heating and gas-making portions in a refractory-lined path comprising two chambers in series, the first of which contains a zone of non-catalytic, refractory, heat-storage material and is in flow communication at a point near one end thereof with one end of the second chamber which contains a zone of catalyst material comprising nickel and an ash screen comprising a bed of randomly arranged pieces of a non-catalytic, refractory, heat-storage material between said zone of catalyst material and said end of said second chamber in communication with said first chamber which comprises, (A) during the heating portion of the cycle, (1) introducing a primary fluid hydrocarbon fuel and an oxygen-containing gas into said first chamber, combusting said primary fuel in said first chamber and passing the hot products of combustion through said zone of non-catalytic, refractory, heat-storage material in said first chamber and then through said ash screen and said zone of catalyst material in said second chamber to store heat therein, and (2) thereafter reducing by more than 75% the rate of introduction of said primary fuel while continuing introduction of said oxygen-containing gas, and, (3) substantially immediately after the products of primary combustion formed just prior to reducing the rate of introduction of said primary fuel have passed at least through that portion of said refractory lined path preceding said zone of catalyst material, introducing a secondary substantially ash-free fluid hydrocarbon fuel into said second chamber at a point adjacent said zone of catalyst material between said ash screen and said zone of catalyst material, combusting said secondary fuel in said oxygen-containing gas and passing all hot products of combustion through said zone of catalyst material to store heat therein, the rate of introduction of said oxygen-containing gas and combustion of said primary fuel and said secondary fuel maintaining throughout the cycle in said catalyst zone an average temperature of from about 1300° to about 1900° F. and in the refractory lined path, zone of non-catalytic, refractory, heat-storage material and ash screen upstream from said catalyst zone an average temperature of from about 1000° to about 1700° F.; and (B) in the gas-making portion of the cycle, vaporizing oil in said first chamber and passing the vaporized oil in association with steam through said zone of non-catalytic, refractory, heat-storage material in said first chamber and said ash screen in said second chamber to heat oil to about reaction temperature with substantially no thermal cracking, and then through said zone of catalyst material wherein conversion of vaporized oil to oil gas takes place, and leading the resulting oil gas to storage.

9. The method of claim 8 in which introduction of primary fuel is substantially discontinued during at least a portion of the time said secondary fuel is introduced.

10. The method of claim 1 wherein the rate of introduction of said oxygen-containing gas and combustion of said primary fuel and said secondary fuel during the heating portion of the cycle maintains throughout the cycle in said catalyst zone an average temperature of from about 1600° to about 1800° F. and in the refractory lined path upstream of said catalyst zone an average temperature of from about 1200° to about 1500° F.

11. The method of claim 4 wherein the rate of introduction of said oxygen-containing gas and combustion of said primary fuel and said secondary fuel during the heating portion of the cycle maintain throughout the cycle in said catalyst zone an average temperature of from about 1600° to about 1800° F. and in the refractory lined path and zone of heat storage material upstream of said catalyst zone an average temperature of from about 1200° to about 1500° F.

12. The method of claim 8 wherein the rate of introduction of said oxygen-containing gas and combustion of said primary and secondary fuel during the heating portion of the cycle maintain throughout the cycle in said catalyst zone an average temperature of from about 1600° to about 1800° F. and in the refractory lined path, zone of non-catalytic, heat-storage, refractory material and ash screen upstream from said catalyst zone an average temperature of from about 1200° to about 1500° F.

References Cited in the file of this patent

UNITED STATES PATENTS

| | | |
|---|---|---|
| 2,002,863 | Nagel | May 28, 1935 |
| 2,700,602 | Voelker | Jan. 25, 1955 |
| 2,743,171 | Janeway | Apr. 24, 1956 |